(12) United States Patent
Yu et al.

(10) Patent No.: US 7,944,239 B2
(45) Date of Patent: May 17, 2011

(54) SYSTEM AND METHOD FOR PROVIDING LIVE INSERTION

(75) Inventors: Ta Lee Yu, Shanghai (CN); Hai Feng Xue, Shanghai (CN); Hui Juan Cheng, Shanghai (CN)

(73) Assignee: Semiconductor Manufacturing International (Shanghai) Corporation, Shanghai (CN)

( * ) Notice: Subject to any disclaimer, the term of this patent is extended or adjusted under 35 U.S.C. 154(b) by 814 days.

(21) Appl. No.: 11/780,419

(22) Filed: Jul. 19, 2007

(65) Prior Publication Data

US 2008/0270662 A1  Oct. 30, 2008

(30) Foreign Application Priority Data

Apr. 24, 2007  (CN) .......................... 2007 1 0039874

(51) Int. Cl.
*H03K 19/094* (2006.01)
(52) U.S. Cl. .............. 326/83; 326/82; 326/86; 327/112; 327/108
(58) Field of Classification Search ............... 326/81–83, 326/86–87; 710/300–302, 100; 327/108–109, 327/111–112, 378, 389, 427, 434, 437
See application file for complete search history.

(56) References Cited

U.S. PATENT DOCUMENTS

| | | | | |
|---|---|---|---|---|
| 5,543,734 A | * | 8/1996 | Volk et al. | 326/83 |
| 5,952,848 A | * | 9/1999 | Morris | 326/81 |
| 6,184,730 B1 | * | 2/2001 | Kwong et al. | 327/112 |
| 6,552,583 B1 | * | 4/2003 | Kwong | 327/112 |

* cited by examiner

*Primary Examiner* — James H. Cho
*Assistant Examiner* — Christopher Lo
(74) *Attorney, Agent, or Firm* — Kilpatrick Townsend and Stockton LLP

(57) ABSTRACT

System and method for providing live insertion. According to an embodiment, the present invention provides an integrated circuit. The integrated circuit includes a first port configured to be electrically coupled to a pad. The first port includes a first connection, a second connection, and a third connection. The integrated circuit also includes a first resistor having a first terminal and a second terminal. Additionally, the integrated circuit includes a second resistor having a third terminal and a forth terminal. The integrated circuit additionally includes a voltage source configured to provided a first voltage. The integrated circuit further includes a first PMOS transistor having a first gate terminal, a first drain terminal and a first source terminal. In addition, the integrated circuit includes a second PMOS transistor having a second gate terminal, a second drain terminal, and a second source terminal.

16 Claims, 9 Drawing Sheets

SYSTEM AND METHOD FOR PROVIDING LIVE INSERTION

CROSS-REFERENCES TO RELATED APPLICATIONS

This application claims priority to Chinese Patent Application No. 200710039874.8, filed Apr. 24, 2007, commonly assigned, incorporated by reference herein for all purposes.

BACKGROUND OF THE INVENTION

The present invention is directed to integrated circuits. More particularly, the invention provides a system and method for providing live insertion. Merely by way of example, the invention has been applied to system buses. But it would be recognized that the invention has a much broader range of applicability.

A system for providing live insertion has many application. The ability to provide live insertion allows insertion and/or removal of a component in a machine without stopping or turning down the machine. For example, many modem personal computers provides live insertion capabilities. Through universal serial bus port, a computer user is able to "live insert" various peripherals (e.g., mouse, keyboard, flash memory, etc.) to a computer that has already been turned on. For most users, the ability to use the live insertion is high convenient, as they are saved from the trouble of turning machines off and on and wait for booting time.

For applications requiring machines to constantly stay on, such as telecommunication switching and data server, it is even more desirable to be able to provide the live insert capability. For example, it is costly for a telecommunication switch in a network to turn off in order to insert and/or remove hardware components, as turning off a switch could me putting thousands of users offline. Similarly, it is highly preferred that data servers remain on all the time, regardless whether new hardware components are being inserted and/or removed.

Desirable as the live insert capability is, the actual implementation of live insert has been difficult. To be able to provide this capability requires a higher level of complexity. For example, it is usually desirable for the live insertion not to interrupt or interfere with the performance of the machine.

In the past, various conventional techniques have been used to provide live insertion capability. For example, localized component shut down was a common technique. As another example, pre-charge circuits have been used to provide live insertion mechanism. There are many other conventional techniques as well. Unfortunately, these conventional techniques are often inadequate.

Therefore, it is desirable to have an improved system and method for providing live insertion techniques.

BRIEF SUMMARY OF THE INVENTION

The present invention is directed to integrated circuits. More particularly, the invention provides a system and method for providing live insertion. Merely by way of example, the invention has been applied to system buses. But it would be recognized that the invention has a much broader range of applicability.

According to an embodiment, the present invention provides an integrated circuit. The integrated circuit includes a first port configured to be electrically coupled to a pad. The first port includes a first connection, a second connection, and a third connection. The integrated circuit also includes a first resistor having a first terminal and a second terminal. Additionally, the integrated circuit includes a second resistor having a third terminal and a forth terminal. The integrated circuit additionally includes a voltage source configured to provided a first voltage. The integrated circuit further includes a first PMOS transistor having a first gate terminal, a first drain terminal and a first source terminal. In addition, the integrated circuit includes a second PMOS transistor having a second gate terminal, a second drain terminal, and a second source terminal. Furthermore, the integrated circuit includes a third PMOS transistor having a third gate terminal, a third drain terminal, and a third source terminal. The integrated circuit also includes a first NMOS transistor having a fourth gate terminal, a fourth drain terminal, and a fourth source terminal. The integrated circuit also includes an I/O pad comprising a plurality of connectors. The plurality of connectors includes a ground connector, a voltage connector, and an I/O connector. The integrated circuit additionally includes a first control circuit providing a first control signal. The first control signal is associated with the I/O pad. In addition, the integrated circuit includes a second control circuit providing a second control signal and a third control signal.

The first source terminal and the third source terminal are electrically coupled to the voltage source. The first gate terminal and the second gate terminal are configured to receive the first control signal. The first drain terminal is electrically coupled to the first terminal. The second terminal is electrically coupled to the I/O pad and the third terminal. The fourth terminal is electrically coupled to the second source terminal. The second drain terminal and the fourth source terminal are biased at ground. The third drain terminal and the fourth source terminal are electrically coupled to the I/O pad. The third gate terminal is configured to receive the second control signal. The fourth gate terminal is configured to receive the third control signal. During a precharge state, the first control signal indicates an "on" signal, and the second control and third control signals indicate an "off" signal.

According to another embodiment, the present invention provides a method for providing live insertion between a component and a system. The method includes a step for providing a voltage source configured to a first voltage. Addition, the method includes a step for providing an I/O pad, the I/O pad including a ground connector, a voltage connector, and an I/O connector. The method also includes a step for providing first control circuit, the first control circuit being configured to provide a first control signal. The method additionally includes a step for providing a second control circuit. The second control circuit is configured to provide a second and a third control signal. The method includes a step for providing a first switching circuit configured to receive the first control signal. The first switching circuit is electrically coupled to the I/O pad. Addition, the method includes a step for providing a second switching circuit configured to receive the second and the third control signal. The second switching circuit is electrically coupled to the I/O pad. Furthermore, the method includes a step for electrically coupling the ground connector to the system while the voltage connector and the I/O connector are open. In addition, the method includes a step for electrically coupling the voltage connector to the system while the voltage connector remains electrically coupled to the system and the I/O connector remains open. Furthermore, the method includes a step for providing the first control signal indicating an "on" state. In addition, the method includes a step for providing the second control signal and the third control signal indicating a first "off" state. Moreover, the method includes a step for charging the I/O pad to a threshold voltage by the first switching circuit in response to the first control signal indicating the "on" state. Additionally, the method includes a step for causing the I/O pad to be in a high-impedance state by the second switching circuit in response the second control signal and the third control signal indicating the first "off" state. In addition, the method includes a step for electrically coupling the I/O connector to the system. Also, the method includes a step for providing the first control signal indicating a second "off" state. Moreover, the method includes a step for turning off the first switching circuit in response to the first control signal indicating the second "off" state.

According to yet another embodiment, the present invention provides an integrated circuit. The integrate circuit includes a first port configured to be electrically coupled to a pad. The first port including a first connection, a second connection, and a third connection. In addition, the integrate circuit includes a first resistor having a first terminal and a second terminal. Furthermore, the integrate circuit includes a second resistor having a third terminal and a forth terminal. Additionally, the integrate circuit includes a voltage source configured to provided a first voltage. Also, the integrate circuit includes a first transistor having a first gate terminal, a first transistor terminal and a second transistor terminal. Moreover, the integrate circuit includes a second transistor having a second gate terminal, a third transistor terminal, and a fourth transistor terminal. In addition, the integrate circuit includes a third transistor having a third gate terminal, a fifth transistor terminal, and a sixth source terminal. Furthermore, the integrate circuit includes a first transistor having a fourth gate terminal, a seventh transistor terminal, and an eighth transistor terminal. Further, the integrate circuit includes an I/O pad comprising a plurality of connectors. The plurality of connectors includes a ground connector, a voltage connector, and an I/O connector. The integrate circuit also includes a first control circuit providing a first control signal. Additionally, the integrate circuit includes a second control circuit providing a second control signal and a third control signal.

The sixth and seventh transistor terminals are electrically coupled to the I/O pad. The first gate terminal and the second gate terminal are configured to receive the first control signal. The third gate terminal is configured to receive the second control signal. The fourth gate terminal is configured to receive the third control signal. The I/O pad is in a high impedance state when the ground connector is biased at ground and the voltage connector and the I/O connector are open. The first gate terminal and the second gate terminal are configured to receive the first control signal. The first control signal turns the first transistor and the second transistor off when the ground connector is biased at ground and the voltage connector and the I/O connector are open. The second control signal turns the third transistor off when the ground connector is biased at ground and the voltage connector and the I/O connector are open. The third control signal turns the fourth transistor off when the ground connector is biased at ground and the voltage connector and the I/O connector are open. The I/O pad is charged to a predetermine voltage level when the ground connector is biased at ground, the voltage connector is connected to the voltage source, and the I/O connector is open. The first control signal turns the first transistor and the second transistor on when the ground connector is biased at ground, the voltage connector is connected to the voltage source, and the I/O connector is open.

It is to be appreciated that, according to various embodiments, the present invention provides various advantages over conventional techniques. For example, the present invention ensures system stability during a live insertion process. According to an embodiment, an I/O pad is charged to a threshold voltage before I/O connections are connected. For example, the precharged I/O pad does not cause the system being connected to flip into an invalid state. There are other benefits as well.

The benefits and various additional objects, features and advantages of the present invention can be fully appreciated with reference to the detailed description and accompanying drawings that follow.

DETAILED DESCRIPTION OF THE INVENTION

The present invention is directed to integrated circuits. More particularly, the invention provides a system and method for providing live insertion. Merely by way of example, the invention has been applied to system buses. But it would be recognized that the invention has a much broader range of applicability.

As discussed above, various conventional techniques for providing live insertion capability have been inadequate. For example, various convention techniques are often inadequate to ensure that the system for live insertion remains stable throughout the process.

Figure 1:
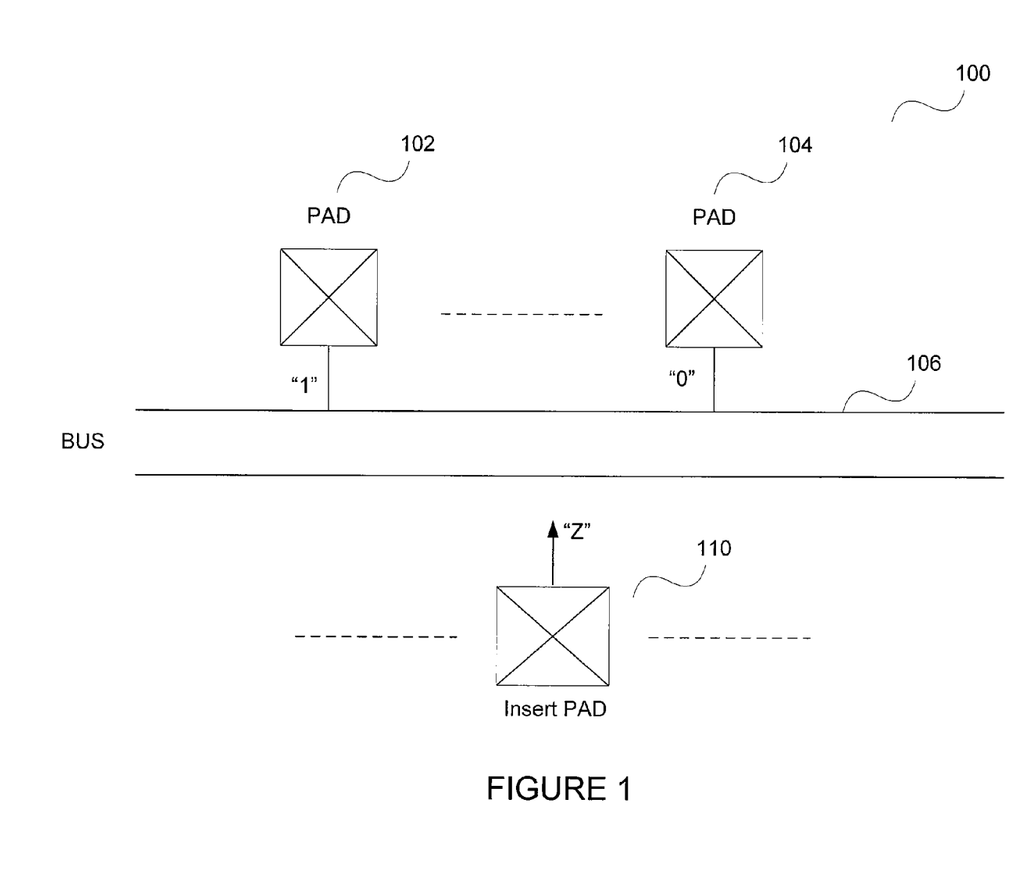
FIG. 1 is a simplified diagram illustrating a live insertion process.

FIG. 1 is a simplified diagram illustrating a live insertion process. This diagram is merely an example, which should not unduly limit the scope of the claims. One of ordinary skill in the art would recognize many variations, alternatives, and modifications. During a live insertion process, an insertion pad 110 is connected to a bus 106 of a system 100. As shown in FIG. 1, the insertion pad 110 usually has an impedance. Usually, the impedance of the insertion pad 110 is high. During the insertion process, the high impedance of the insertion pad 110 often forces the signal carried by the bus 106 to a difference voltage. For example, the insertion pad 110 forces the bus signal to a ground state. As another example, the insertion pad 110 forces the bus signal to a VCC state. Usually, the change in voltage on the bus signal is asymptotically related to the impedance of the insertion pad. Such change of voltage on the bus signal usually causes problems for the system 100, as the system 100 could be forced into an invalid state as a result. When the bus 106 is being used for transmitting as the live insertion process occurs, the system 100 is even more likely to fall into an invalid state.

Figure 2:
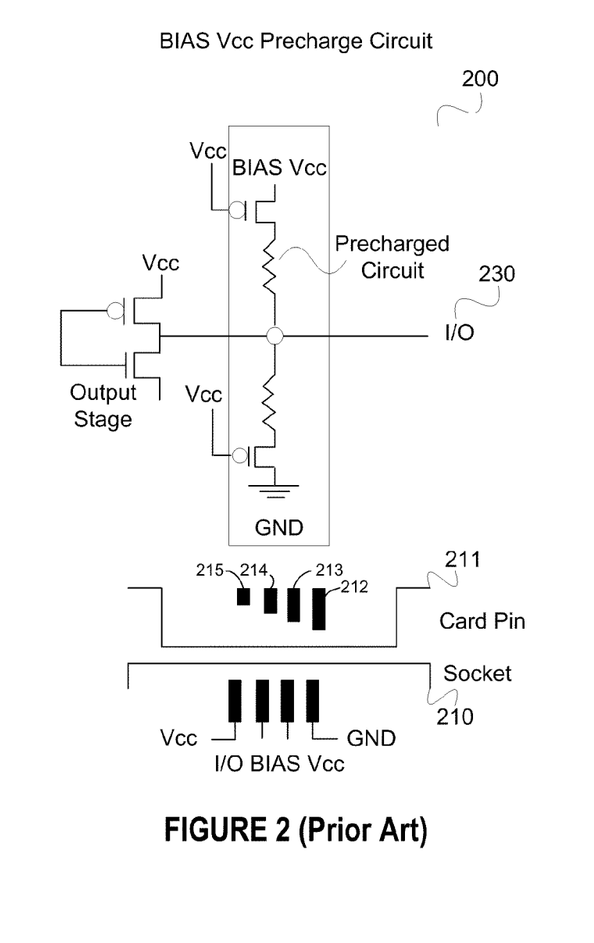
FIG. 2 is a simplified diagram illustrating a conventional system that provides live insertion.

FIG. 2 is a simplified diagram illustrating a conventional system that provides live insertion. This diagram is merely an example, which should not unduly limit the scope of the claims. One of ordinary skill in the art would recognize many variations, alternatives, and modifications. As shown in FIG. 2, a conventional system 200 is used to provide live insertion capability. A live insertion is to be established between the socket 210 and the card connector 211. It is to be noted that pins on card connector 211 have different length. For example, a pin 212 for connection to the ground has the longest protrusion so that the ground connection is established first during the live insertion process. A pin 213 for connecting to the bias voltage has the second longest protrusion so that the bias voltage connection is established right after the ground pin 212 is connected. This particular order of connection provides some protection to the system during the live insertion process. For example, the connection of ground and bias voltage allows the connecting circuit to be precharged before the input and output (I/O) port 230 are connected. Typically, the I/O port 230 has a voltage that equals to half of the bias voltage at the time when I/O port 230 is connected. While conventional techniques as used for system 200 provides some measures of hardware protection, such techniques are often inadequate.

Figure 3:
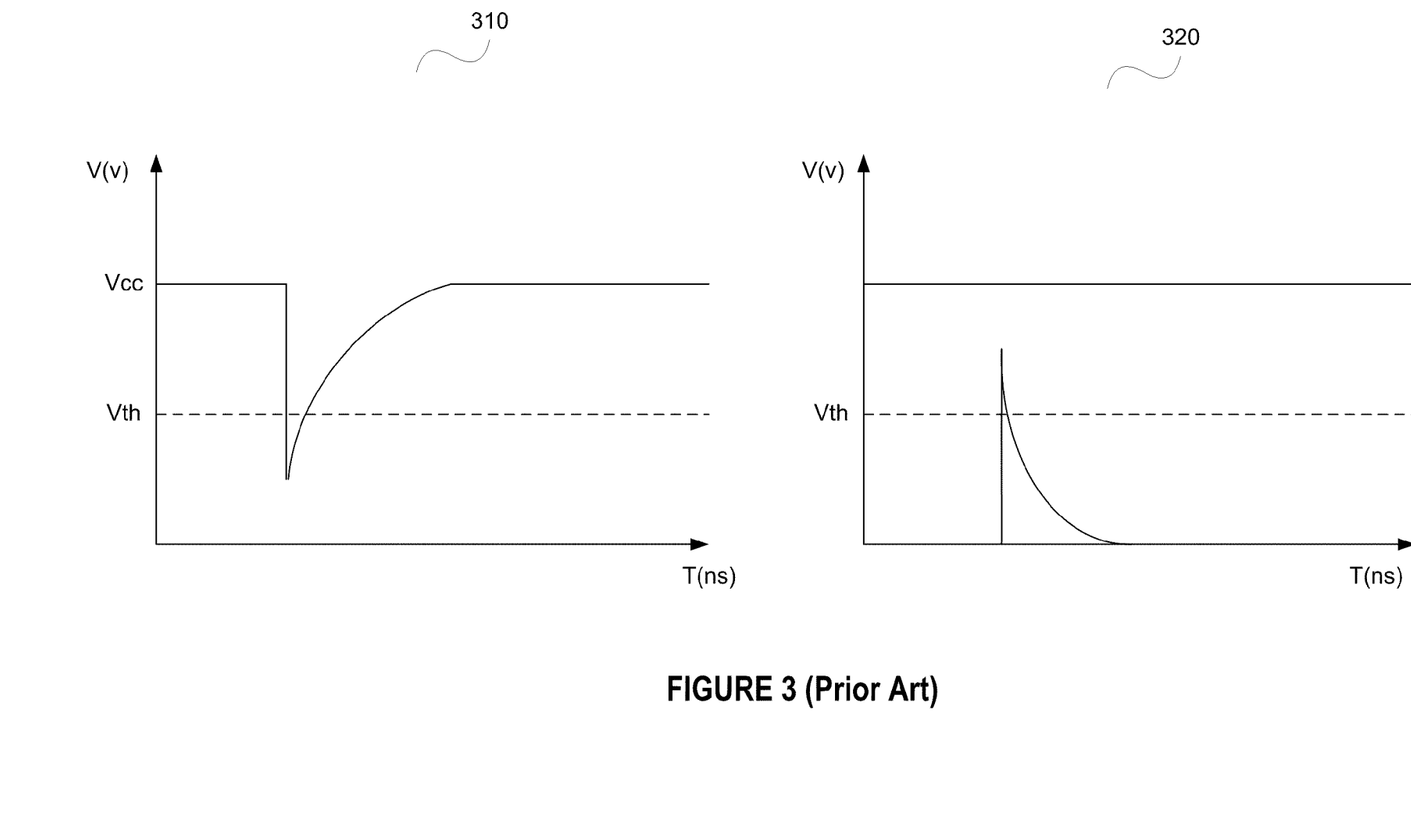
FIG. 3 is a simplified diagram illustrating effects of live insertion on a conventional system.

FIG. 3 is a simplified diagram illustrating effects of live insertion on a conventional system. This diagram is merely an example, which should not unduly limit the scope of the claims. One of ordinary skill in the art would recognize many variations, alternatives, and modifications. For example, graphs 310 and 320 illustrate the insertion process on the system 200 from FIG. 2. The graph 310 illustrates an effect of live insertion when the bus signal is at voltage level VCC. As seen in graph 310, the insertion of a high impedance pad causes an abrupt voltage drop of the bus signal to a voltage level below a threshold voltage. For example, the threshold voltage is used to determine when the bus signal is at high or low. The temporary voltage drop to below the threshold voltage can causes an error reading or a "logic flip" (i.e., an incorrect logic low reading). Often, live insertion techniques practice in conventional systems also causes bus contention.

The graph 320 illustrates an effect of live insertion when the bus signal is biased at ground. As seen in graph 320, the insertion of a high impedance pad causes an abrupt voltage rise of the bus signal to a voltage level above a threshold voltage. For example, the threshold voltage is used to determine when the bus signal is at high or low. The temporary voltage rise to above the threshold voltage can causes an error reading or a "logic flip" (i.e., an incorrect logic high reading). Often, live insertion techniques practice in conventional systems also causes bus contention. Therefore, it is to be appreciated that according to various embodiments, the present invention provides a superior solution for live insertion.

Figure 4:
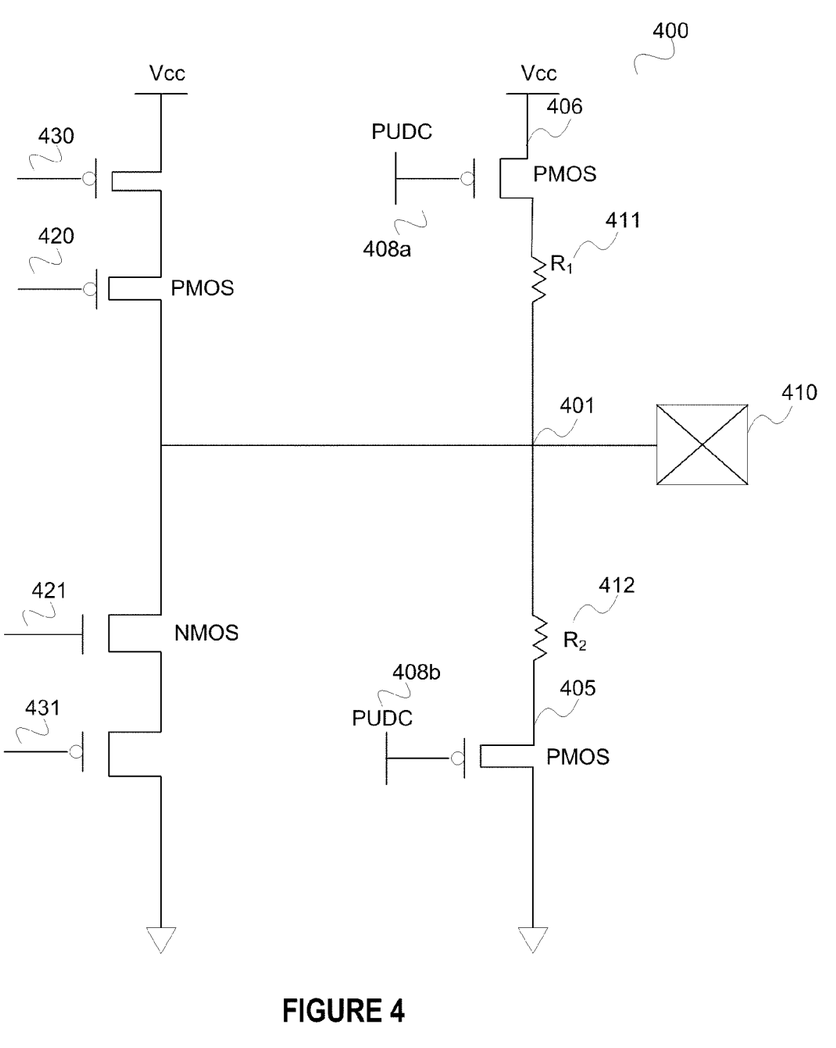
FIG. 4 is a simplified diagram illustrating a live insertion system according to an embodiment of the present invention.

FIG. 4 is a simplified diagram illustrating a live insertion system according to an embodiment of the present invention. This diagram is merely an example, which should not unduly limit the scope of the claims. One of ordinary skill in the art would recognize many variations, alternatives, and modifications. The live insertion system 400 includes the following components:

1. insertion pad 410;
2. a PMOS 405;
3. a PMOS 406;
4. a resistor 411;
5. a resistor 412;
6. a PMOS 420;
7. an NMOS 421;
8. a PMOS 430; and
9. a PMOS 431.

Figure 5:
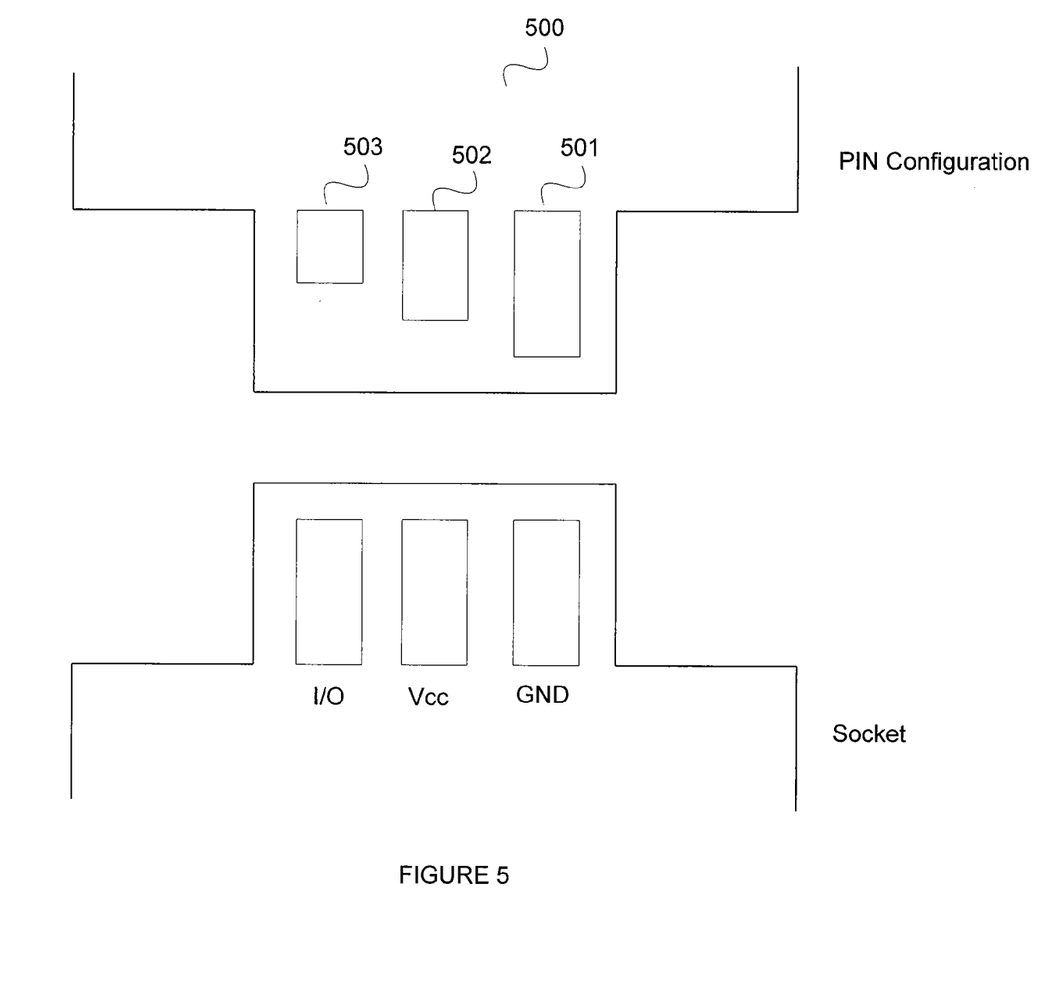
FIG. 5 is a simplified diagram illustrating an insertion pad according to an embodiment of the present invention.

As shown in FIG. 4, the insertion pad 410 is being connected. FIG. 5 is a simplified diagram illustrating an insertion pad according to an embodiment of the present invention. This diagram is merely an example, which should not unduly limit the scope of the claims. One of ordinary skill in the art would recognize many variations, alternatives, and modifications. For example, the PMOS 405 and 406 may be implemented with NMOS transistors.

As shown, insertion pins have difference lengths. A pin 501 for connection to the ground has the greatest length, a pin 502 for connection to VCC has the second greatest length, and a pin 503 for connection to the I/O has the shortest length. During the insertion process, the ground connection is established first, then the VCC connection is established, and the I/O connection is established last.

Now referring back to the FIG. 4. During the insertion process, the ground connection is established first. Next, the bias voltage VCC is connected and the insertion device is charged to a predetermined voltage. For example, the predetermined voltage is a threshold voltage at VCC/2 at the node 401. According to the embodiment, the resistors 411 and 412 have substantially the same resistance so that the voltage drop between VCC and ground is equally divided between the two resistors. For example, when the VCC is 3.3 volts, the node 401 has a voltage of 1.65 volts.

When the bias voltage VCC is connected, the PMOS 420 and NMOS 421 are both turned off, which causes the insertion pad 410 to stay at a high impedance state. For example, the respective "on" and "off" states of the PMOS 420 and the NMOS 421 are controlled by an external circuit. When PMOS 420 turns on, the insertion pad 410 is charge to the VCC voltage. Depending upon applications, the PUDC can be used to turn the PMOS 420 and NMOS 421 on or off.

The time to charge the insertion pad 410 depends from various factors, such as the load on the insertion pad, etc. During the time when the insertion pad 410 is being charged, the PMOS 405 and 406 are at an "on" state, where electrical current is conducted through the PMOS 405 and 406. The "on" state of the PMOS 405 and 406 is based on the input from a power on detection circuit (PUDC).

Figure 6:
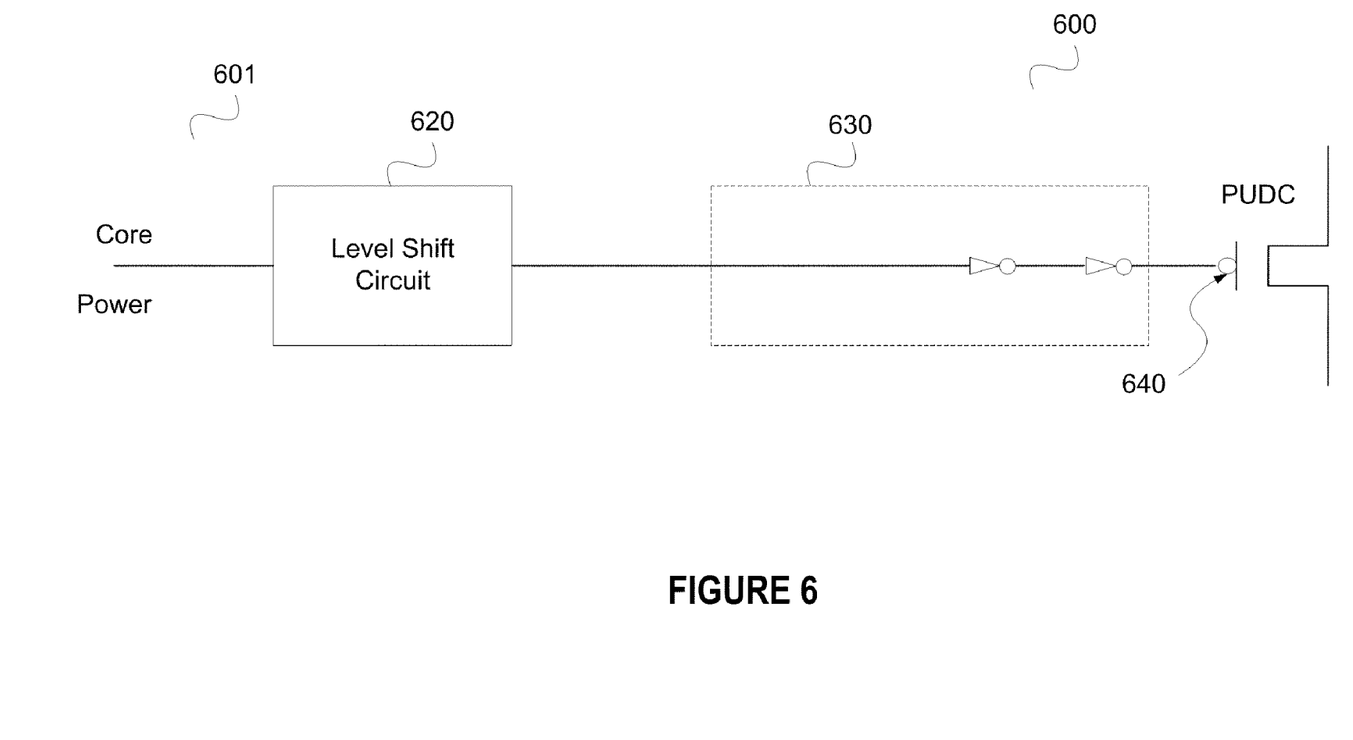
FIG. 6 is a simplified diagram illustrating a power on detection circuit (PUDC) according to an embodiment of the present invention.

FIG. 6 is a simplified diagram illustrating a power on detection circuit (PUDC) according to an embodiment of the present invention. This diagram is merely an example, which should not unduly limit the scope of the claims. One of ordinary skill in the art would recognize many variations, alternatives, and modifications. In addition, it is to be appreciated that depending upon applications, the present invention may be implemented with other types of PUDC circuits. A PUDC circuit 600 in FIG. 6 includes a voltage supply 601, a level shift circuit 620, and a path 630. The PUDC 600 receives a voltage input from the voltage supply 601 by the level shift circuit 620. For example, the voltage supply 601 has a core power voltage of 1.2 volt. The level shift circuit 620 is configured to provide a predetermined voltage to the path 630. For example, the predetermined voltage is 3.3 volt. For example, the path 630 includes one or more inverters to provide further adjustment at the output 640. It is to be appreciated that depending upon application, the PUDC 600 is configured to provide any voltage levels that are required to turn on or off the PMOS in FIG. 4. Since PMOS transistors are used, a zero voltage from the PUDC 600 turns on the PMOS, and an operating voltage (e.g., 3.3 volts) turns off the PMOS. According to another embodiment wherein PMOS transistors are replaced with NMOS transistors, the PUDC 600 provides a high voltage level for turning the transistors on and a low voltage level for turning the transistors off.

Figure 7:
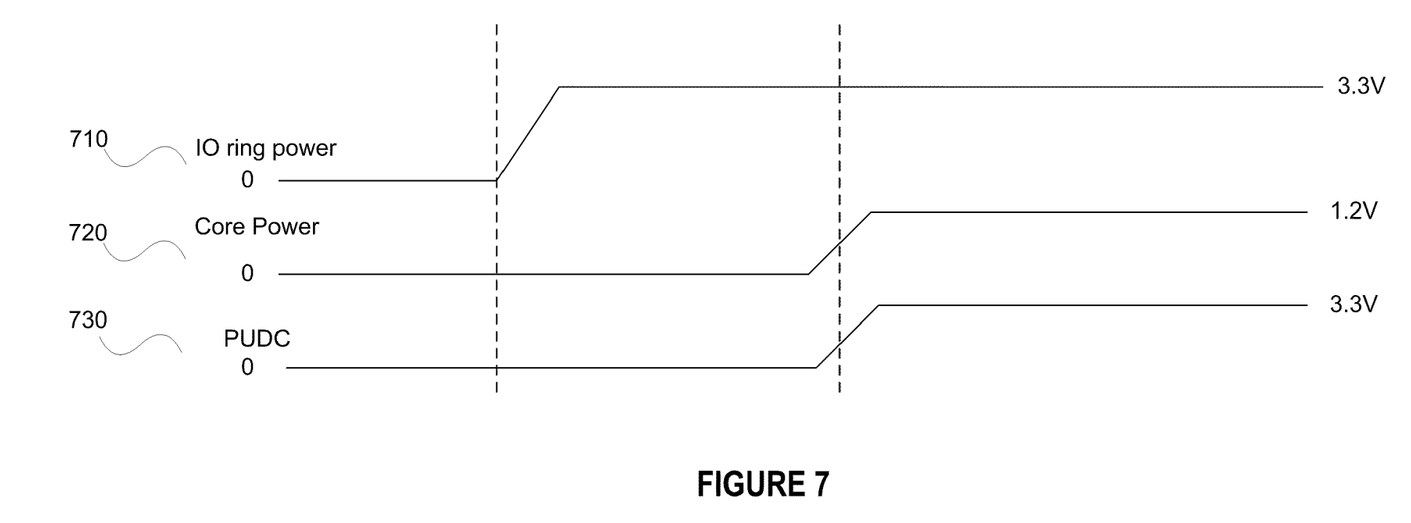
FIG. 7 is a simplified diagram illustrating voltages level of various terminals.

FIG. 7 is a simplified diagram illustrating voltages level of various terminals. This diagram is merely an example, which should not unduly limit the scope of the claims. One of ordinary skill in the art would recognize many variations, alternatives, and modifications. As shown in FIG. 7, the output of the PUDC is based on two input voltages. When the first input voltage 710 is at 3.3 volts, the PUDC has a zero output voltage. For example, the first input voltage 710 is the VCC voltage in FIG. 4. When both the first input voltage 710 is at 3.3 volts and the second input voltage 720 is at 1.2 volt, the PUDC carries a voltage of 3.3 volts. For example, the second input voltage 720 comes from a separate voltage source that is connected to the PUDC.

Now referring back to FIG. 4. The PMOS 405 and 406 are at an "on" state before the I/O pin of the insertion pad is connected. For example, a zero voltage at the gates of the PMOS 405 and 406 by the PUDC turns the transistors on. Once the I/O pin of the insertion pad 410 is connected, the PMOS 405 and 406 are turned off by the PUDC 600. According to an embodiment, the PMOS 405 and 406 are turned on when PUDC is at zero volt, and PMOS 405 and 406 are turned off when PUDC is at 3.3 volts.

It is to be appreciated that by the time the I/O pin of the insertion pad is connected, the insertion pad has been precharged to a proper voltage. According to the embodiment, the present invention ensures that insertion pad is proper charged before I/O's are connected. As a benefit of the present invention, the system 400 does not fall into an invalid state during the live insertion process.

Figure 8:
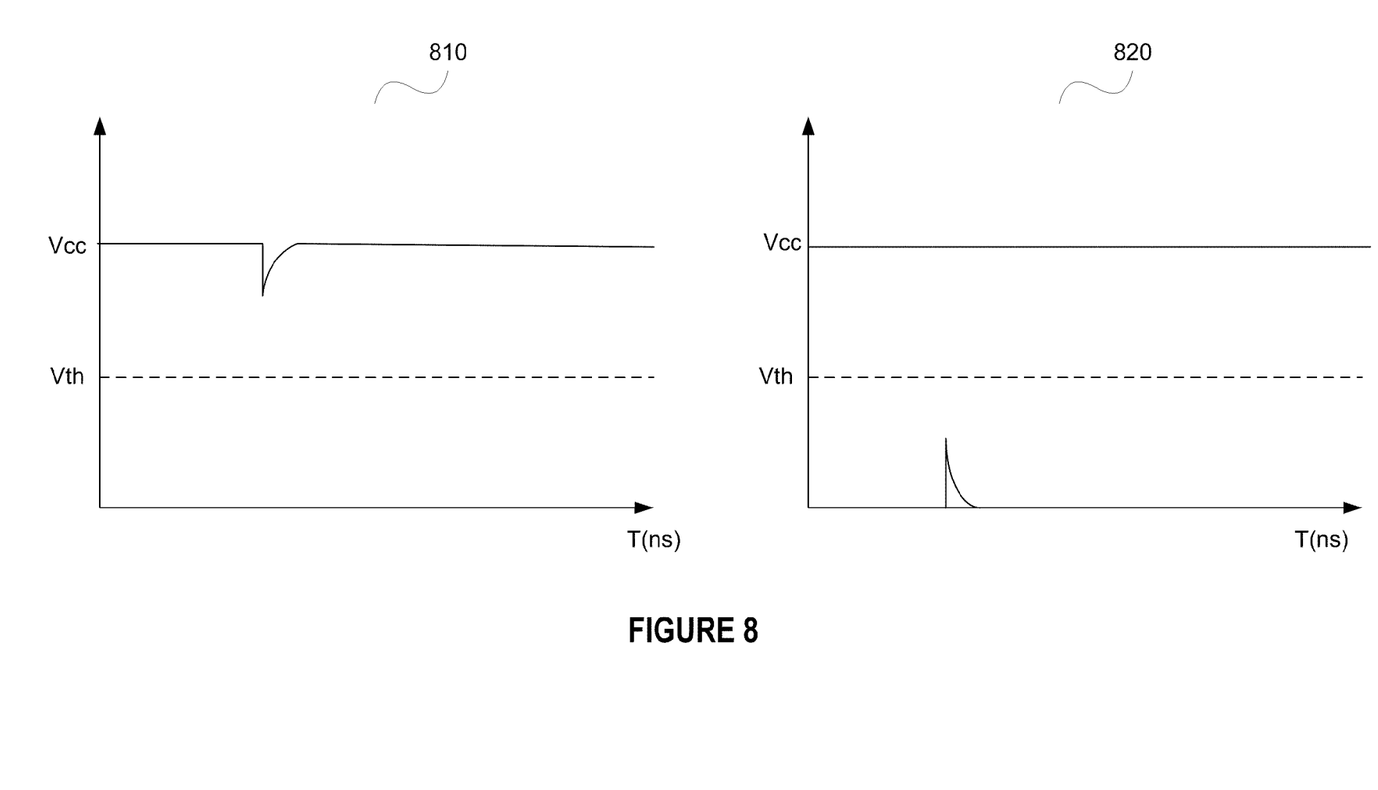
FIG. 8 is a simplified diagram illustrating effects of live insertion on a conventional system.

FIG. 8 is a simplified diagram illustrating effects of live insertion on a conventional system. This diagram is merely an example, which should not unduly limit the scope of the claims. One of ordinary skill in the art would recognize many variations, alternatives, and modifications. For example, graphs 810 and 820 illustrate the insertion process on the system 400 from FIG. 4. The graph 810 illustrates an effect of live insertion when the bus signal is at voltage level VCC. As seen in graph 810, the insertion of a high impedance pad causes an abrupt voltage drop of the bus signal. However, the voltage drop does not cause the voltage level to drop below the threshold voltage. For example, the threshold voltage is used to determine when the bus signal is at high or low. The temporary voltage drop in the graph 810 does not causes an error reading or a "logic flip" (i.e., an incorrect logic low reading).

Figure 9:
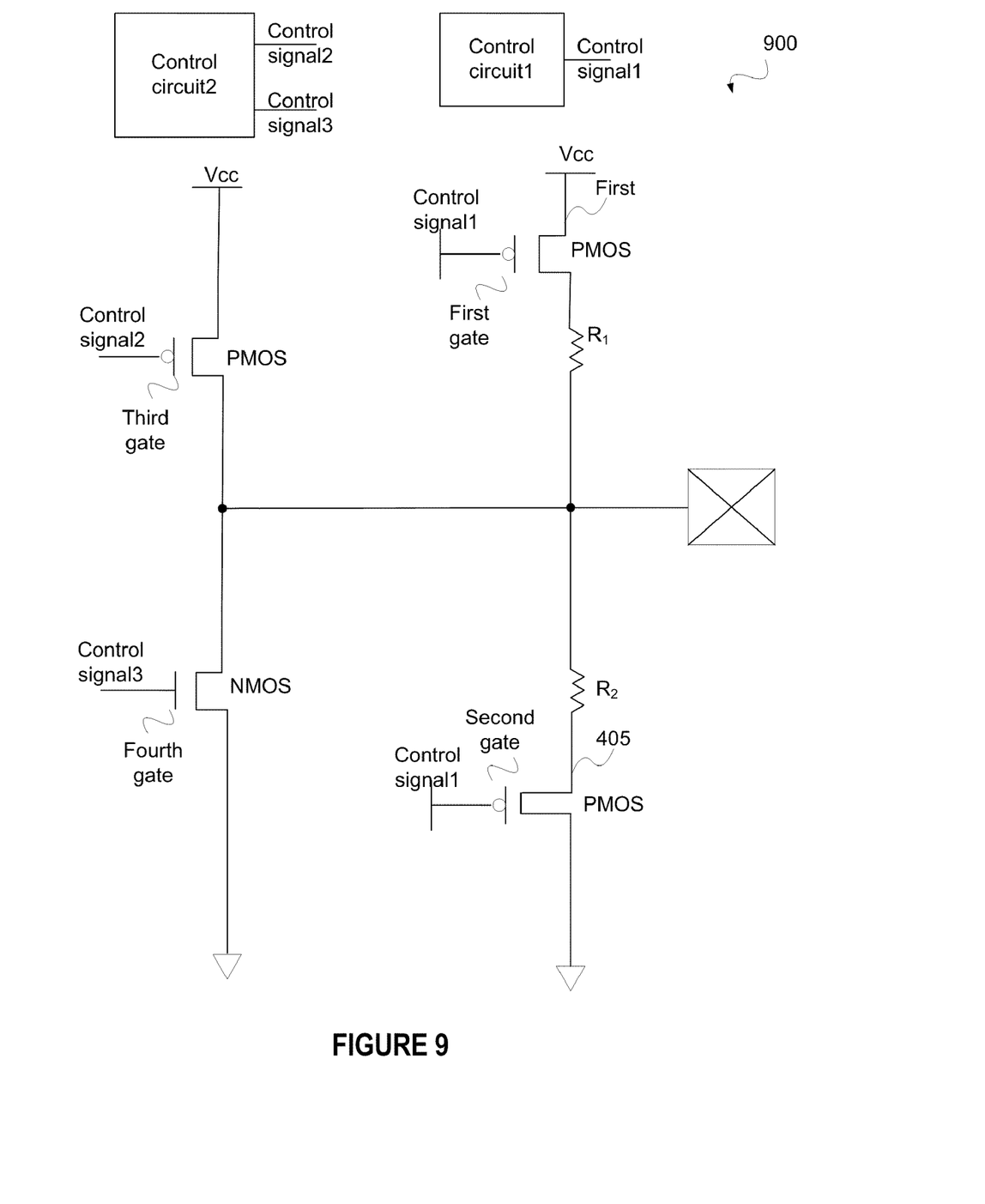
FIG. 9 is a simplified diagram illustrating a live insertion system according to an embodiment of the present invention.

FIG. 9 is a simplified diagram illustrating a live insertion system 900 according to an embodiment of the present invention. System 900 includes a first resistor R1 having a first terminal and a second terminal, a second resistor R2 having a third terminal and a forth terminal, a voltage source Vcc configured to provided a first voltage, a first PMOS transistor having a first gate terminal, a first drain terminal and a first source terminal, a second PMOS transistor having a second gate terminal, a second drain terminal, and a second source terminal, a third PMOS transistor having a third gate terminal, a third drain terminal, and a third source terminal, and a first NMOS transistor having a fourth gate terminal, a fourth drain terminal, and a fourth source terminal. System 900 also includes a first control circuit providing a first control signal1, the first control signal1 is associated with an I/O pad. System 900 further includes a second control circuit2 providing a second control signal2 and a third control signal3. In an embodiment, the first source terminal and the third source terminal are electrically coupled to the voltage source, and the first gate terminal and the second gate terminal are configured to directly receive the first control signal1, the first drain terminal is electrically coupled to the first terminal, the second terminal is electrically coupled to the I/O pad and the third terminal, the fourth terminal is electrically coupled to the second source terminal, the second drain terminal and the fourth source terminal are biased at a ground potential, the third drain terminal and the fourth source terminal are electrically coupled to the I/O pad, the third gate terminal is configured to receive the second control signal2, the fourth gate terminal is configured to receive the third control signal. In an embodiment, during a precharge state, the first control signal1 indicates an "on" signal, and the second and third control signals indicate an "off" signal.

The graph 820 illustrates an effect of live insertion when the bus signal is biased at ground. As seen in graph 820, the insertion of a high impedance pad causes an abrupt voltage rise of the bus signal. However, the voltage drop does not cause the voltage level to rise above the threshold voltage. For example, the threshold voltage is used to determine when the bus signal is at high or low. The small temporary voltage rise as shown in the graph 820 does not cause an error reading or a "logic flip" (i.e., an incorrect logic high reading). Therefore, it is to be appreciated that the present invention provides a safer system and method for live insertion, as compared to convention techniques.

According to an embodiment, the present invention provides an integrated circuit. The integrated circuit includes a first port configured to be electrically coupled to a pad. The first port includes a first connection, a second connection, and a third connection. The integrated circuit also includes a first resistor having a first terminal and a second terminal. Additionally, the integrated circuit includes a second resistor having a third terminal and a forth terminal. The integrated circuit additionally includes a voltage source configured to provided a first voltage. The integrated circuit further includes a first PMOS transistor having a first gate terminal, a first drain terminal and a first source terminal. In addition, the integrated circuit includes a second PMOS transistor having a second gate terminal, a second drain terminal, and a second source terminal. Furthermore, the integrated circuit includes a third PMOS transistor having a third gate terminal, a third drain terminal, and a third source terminal. The integrated circuit also includes a first NMOS transistor having a fourth gate terminal, a fourth drain terminal, and a fourth source terminal. The integrated circuit also includes an I/O pad comprising a plurality of connectors. The plurality of connectors includes a ground connector, a voltage connector, and an I/O connector. The integrated circuit additionally includes a first control circuit providing a first control signal. The first control signal is associated with the I/O pad. In addition, the integrated circuit includes a second control circuit providing a second control signal and a third control signal.

The first source terminal and the third source terminal are electrically coupled to the voltage source. The first gate terminal and the second gate terminal are configured to receive the first control signal. The first drain terminal is electrically coupled to the first terminal. The second terminal is electrically coupled to the I/O pad and the third terminal. The fourth terminal is electrically coupled to the second source terminal. The second drain terminal and the fourth source terminal are biased at ground. The third drain terminal and the fourth drain terminal are electrically coupled to the I/O pad. The third gate terminal is configured to receive the second control signal. The fourth gate terminal is configured to receive the third control signal. During a precharge state, the first control signal indicates an "on" signal, and the second control and third control signals indicate an "off" signal. For example, the embodiment is illustrated in FIGS. 4-6.

According to another embodiment, the present invention provides a method for providing live insertion between a component and a system. The method includes a step for providing a voltage source configured to produce a first voltage. Additionally, the method includes a step for providing an I/O pad, the I/O pad including a ground connector, a voltage connector, and an I/O connector. The method also includes a step for providing a first control circuit, the first control circuit being configured to provide a first control signal. The method additionally includes a step for providing a second control circuit. The second control circuit is configured to provide a second control signal and a third control signal. The method includes a step for providing a first switching circuit configured to receive the first control signal. The first switching circuit is electrically coupled to the I/O pad. Additionally, the method includes a step for providing a second switching circuit configured to receive the second control signal and the third control signal. The second switching circuit is electrically coupled to the I/O pad. Furthermore, the method includes a step for electrically coupling the ground connector to the system while the voltage connector and the I/O connector are open. In addition, the method includes a step for electrically coupling the voltage connector to the system while the ground connector remains electrically coupled to the system and the I/O connector remains open. Furthermore, the method includes a step for providing the first control signal indicating an "on" state. In addition, the method includes a step for providing the second control signal and the third control signal indicating a first "off" state. Moreover, the method includes a step for charging the I/O pad to a threshold voltage by the first switching circuit in response to the first control signal indicating the "on" state. Additionally, the method includes a step for causing the I/O pad to be in a high-impedance state by the second switching circuit in response to the second control signal and the third control signal indicating the first "off" state. In addition, the method includes a step for electrically coupling the I/O connector to the system. Also, the method includes a step for providing the first control signal indicating a second "off" state. Moreover, the method includes a step for turning off the first switching circuit in response to the first control signal indicating the second "off" state. For example, the embodiment is illustrated in FIGS. 4-6.

According to yet another embodiment, the present invention provides an integrated circuit. The integrate circuit includes a first port configured to be electrically coupled to a pad. The first port including a first connection, a second connection, and a third connection. In addition, the integrate circuit includes a first resistor having a first terminal and a second terminal. Furthermore, the integrate circuit includes a second resistor having a third terminal and a forth terminal. Additionally, the integrate circuit includes a voltage source configured to provide a first voltage. Also, the integrate circuit includes a first transistor having a first gate terminal, a first transistor terminal and a second transistor terminal. Moreover, the integrate circuit includes a second transistor having a second gate terminal, a third transistor terminal, and a fourth transistor terminal. In addition, the integrate circuit includes a third transistor having a third gate terminal, a fifth transistor terminal, and a sixth source terminal. Furthermore, the integrate circuit includes a fourth transistor having a fourth gate terminal, a seventh transistor terminal, and an eighth transistor terminal. Further, the integrate circuit includes an I/O pad comprising a plurality of connectors. The plurality of connectors includes a ground connector, a voltage connector, and an I/O connector. The integrate circuit also includes a first control circuit providing a first control signal. Additionally, the integrate circuit includes a second control circuit providing a second control signal and a third control signal. For example, the embodiment is illustrated in FIGS. 4-6.

The sixth and seventh transistor terminals are electrically coupled to the I/O pad. The first gate terminal and the second gate terminal are configured to receive the first control signal. The third gate terminal is configured to receive the second control signal. The fourth gate terminal is configured to receive the third control signal. The I/O pad is in a high impedance state when the ground connector is biased at ground and the voltage connector and the I/O connector are open. The first gate terminal and the second gate terminal are configured to receive the first control signal. The first control signal turns the first transistor and the second transistor off when the ground connector is biased at ground and the voltage connector and the I/O connector are open. The second control signal turns the third transistor off when the ground connector is biased at ground and the voltage connector and the I/O connector are open. The third control signal turns the fourth transistor off when the ground connector is biased at ground and the voltage connector and the I/O connector are open. The I/O pad is charged to a predetermine voltage level when the ground connector is biased at ground, the voltage connector is connected to the voltage source, and the I/O connector is open. The first control signal turns the first transistor and the second transistor on when the ground connector is biased at ground, the voltage connector is connected to the voltage source, and the I/O connector is open.

It is to be appreciated that, according to various embodiments, the present invention provides various advantages over conventional techniques. For example, the present invention ensures system stability during a live insertion process. According to an embodiment, an I/O pad is charged to a threshold voltage before I/O connections are connected. For example, the precharged I/O pad does not cause the system being connected to flip into an invalid state. There are other benefits as well.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:
1. An integrated circuit comprising:
 a first port configured to be electrically coupled to a pad, the first port including a first connection, a second connection, and a third connection;
 a first resistor having a first terminal and a second terminal;
 a second resistor having a third terminal and a forth terminal;
 a voltage source configured to provided a first voltage;
 a first PMOS transistor having a first gate terminal, a first drain terminal and a first source terminal;
 a second PMOS transistor having a second gate terminal, a second drain terminal, and a second source terminal;
 a third PMOS transistor having a third gate terminal, a third drain terminal, and a third source terminal;
 a first NMOS transistor having a fourth gate terminal, a fourth drain terminal, and a fourth source terminal;
 an I/O pad comprising a plurality of connectors, the plurality of connectors including a ground connector, a voltage connector, and an I/O connector;
 a first control circuit providing a first control signal, the first control signal being associated with the I/O pad;
 a second control circuit providing a second control signal and a third control signal;
 wherein:
  the first source terminal and the third source terminal are electrically coupled to the voltage source;

the first gate terminal and the second gate terminal are configured to directly receive the first control signal;

the first drain terminal is electrically coupled to the first terminal;

the second terminal is electrically coupled to the I/O pad and the third terminal;

the fourth terminal is electrically coupled to the second source terminal;

the second drain terminal and the fourth source terminal are biased at ground;

the third drain terminal and the fourth source terminal are electrically coupled to the I/O pad;

the third gate terminal is configured to receive the second control signal;

the fourth gate terminal is configured to receive the third control signal;

during a precharge state, the first control signal indicates an "on" signal, and the second control and third control signals indicate an "off" signal.

2. The integrated circuit of claim 1 wherein the first voltage is 3.3 volts.

3. The integrated circuit of claim 1 wherein the second control signal and the third control signal are logic signals complementing each other.

4. The integrated circuit of claim 1 wherein the "on" signal indicated by the first control signal comprises a zero voltage signal.

5. The integrated circuit of claim 1, wherein the I/O pad is configured to be in a high-impedance state when the ground connector is connected to an external connection and the voltage connector and the I/O connector are open.

6. The integrated circuit of claim 1 wherein the first resistor and the second resistor have substantially a same resistance.

7. A method for providing live insertion between a component and a system, the method comprising:
   providing a voltage source configured to produce a first voltage;
   providing an I/O pad, the I/O pad including a ground connector, a voltage connector, and an I/O connector;
   providing a first control circuit, the first control circuit being configured to provide a first control signal;
   providing a second control circuit, the second control circuit being configured to provide a second control signal and a third control signal;
   providing a first switching circuit configured to only receive the first control signal, the first switching circuit being electrically coupled to the I/O pad;
   providing a second switching circuit configured to receive the second control signal and the third control signal, the second switching circuit being electrically coupled to the I/O pad;
   electrically coupling the ground connector to the system while the voltage connector and the I/O connector are open;
   electrically coupling the voltage connector to the system while the voltage ground connector remains electrically coupled to the system and the I/O connector remains open;
   providing the first control signal indicating an "on" state;
   providing the second control signal and the third control signal indicating a first "off" state;
   charging the I/O pad to a threshold voltage by the first switching circuit in response to the first control signal indicating the "on" state;
   causing the I/O pad to be in a high-impedance state by the second switching circuit in response to the second control signal and the third control signal indicating the first "off" state;
   electrically coupling the I/O connector to the system;
   providing the first control signal indicating a second "off" state; and
   turning off the first switching circuit in response to the first control signal indicating the second "off" state.

8. The method of claim 7 wherein the first control circuit is a power on detect circuit.

9. The method of claim 7 wherein the threshold voltage approximately equals to 50% of the first voltage.

10. The method of claim 7 wherein the threshold voltage is about 3.3 volts.

11. The method of claim 7 wherein the first switching circuit comprises two PMOS transistors.

12. The method of claim 7 wherein the first switching circuit comprises two NMOS transistors.

13. The method of claim 7 wherein the second switching circuit comprises a PMOS transistor and an NMOS transistor.

14. An integrated circuit comprising:
   a first port configured to be electrically coupled to a pad, the first port including a first connection, a second connection, and a third connection;
   a first resistor having a first terminal and a second terminal;
   a second resistor having a third terminal and a forth terminal;
   a voltage source configured to provided a first voltage;
   a first transistor having a first gate terminal, a first transistor terminal and a second transistor terminal;
   a second transistor having a second gate terminal, a third transistor terminal, and a fourth transistor terminal;
   a third transistor having a third gate terminal, a fifth transistor terminal, and a sixth transistor terminal;
   a fourth transistor having a fourth gate terminal, a seventh transistor terminal, and an eighth transistor terminal;
   an I/O pad comprising a plurality of connectors, the plurality of connectors including a ground connector, a voltage connector, and an I/O connector;
   a first control circuit providing a first control signal; and
   a second control circuit providing a second control signal and a third control signal;
   wherein:
      the sixth and seventh transistor terminals are electrically coupled to the I/O pad;
      the first gate terminal and the second gate terminal are configured to directly receive the first control signal;
      the third gate terminal is configured to receive the second control signal;
      the fourth gate terminal is configured to receive the third control signal;
      the I/O pad is in a high impedance state when the ground connector is biased at ground and the voltage connector and the I/O connector are open;
      the first control signal turns the first transistor and the second transistor off when the ground connector is biased at ground and the voltage connector and the I/O connector are open;
      the second control signal turns the third transistor off when the ground connector is biased at ground and the voltage connector and the I/O connector are open;
      the third control signal turns the fourth transistor off when the ground connector is biased at ground and the voltage connector and the I/O connector are open;

the I/O pad is charged to a predetermine voltage level when the ground connector is biased at ground, the voltage connector is connected to the voltage source, and the I/O connector is open;

the first control signal turns the first transistor and the second transistor on when the ground connector is biased at ground, the voltage connector is connected to the voltage source, and the I/O connector is open.

15. The integrated circuit of claim 14 wherein:
the first transistor, the second transistor, and the third transistor are PMOS transistors; and
the fourth transistor is an NMOS transistor.

16. The integrated circuit of claim 14 wherein the predetermined voltage is 3.3 volts.

* * * * *